United States Patent [19]
Komatsubara

[11] 3,970,906
[45] July 20, 1976

[54] BRAKING DEVICE FOR THREE-MOTOR TYPE TAPE RECORDER

[75] Inventor: Masahiro Komatsubara, Tokorozawa, Japan

[73] Assignee: Pioneer Electronic Corporation, Tokyo, Japan

[22] Filed: Nov. 19, 1974

[21] Appl. No.: 525,264

[30] Foreign Application Priority Data
Nov. 19, 1973   Japan.................... 48-132665[U]

[52] U.S. Cl..................................... 318/7; 318/88
[51] Int. Cl.²..................................... B65H 59/38
[58] Field of Search ................. 318/6, 7, 60, 78, 88

[56] References Cited
UNITED STATES PATENTS

| | | |
|---|---|---|
| 3,117,262 | 1/1964 | Mullin.................................. 318/7 |
| 3,512,733 | 5/1970 | Ault.................................. 318/7 X |
| 3,836,831 | 9/1974 | Van Heelsbergen.................... 318/7 |

*Primary Examiner*—B. Dobeck
*Attorney, Agent, or Firm*—Sughrue, Rothwell, Mion, Zinn & Macpeak

[57] ABSTRACT

Various combinations of diodes and resistors are connected in parallel with the tape reel driving motors of a tape recorder, whereby the braking force on each motor can be controlled relative to the direction of motor rotation. Consequently, the running tape can be quickly stopped without either breaking the tape or permitting a slack in the tape to occur.

6 Claims, 4 Drawing Figures

(I)

(II)

(III)

(IV)

(V)

BRAKING DEVICE FOR THREE-MOTOR TYPE TAPE RECORDER

BACKGROUND OF THE INVENTION

1. Field of the Invention

The present invention relates generally to a three-motor type tape recorder and more particularly, to a braking device for such a tape recorder, wherein the braking is effected by an electromagnetic action, and a directional braking torque ratio, that is, a difference in braking torques for opposite directions of motor rotation, is obtained by connecting various combinations of rectifiers and resistors in parallel with the motors.

2. Description of the Prior Art

The brake of a tape recorder has to provide such features as not damaging or breaking the tape while at the same time avoiding slackening of the tape, and also stopping the running of the tape in as short a time period as possible.

One type of prior art brake is a mechanical, frictional brake. The braking force produced by a frictional brake is essentially independent of rotational direction of the reel shaft, and a substantially constant braking power is obtained for both directions of rotation. A directional difference in frictional braking is obtained in the cases where two kinds of brake shoes are used or a block braking is adopted. In such a case, tape slackening is prevented and a quick stopping can be effected, but the effect of environmental conditions on the coefficient of friction between the brake lining and the brake drum, the variation thereof with the lapse of time, and the heat produced by the friction loss are all great, all of which factors create a problem of instability whereby the tape is liable to be damaged.

Electromagnetic braking is another known type of braking. There are two types of electromagnetic braking. In one type, the driving torque is braked; in the other type a reverse torque is applied to the rotating reel shaft. In the first type where the torque is braked, an electric power generating brake is utilized, and the braking torque is proportional to the number of revolutions of the reel shaft, but because of the absence of directional difference in the braking, there is a tendency of producing slackening in the tape. However, regarding the braking itself, it is extremely stable as it is not affected by the environmental conditions, variation with lapse of time, or heat generation.

On the other hand, in the second type wherein a reverse torque is applied to the rotating reel shaft, the reverse torque is produced by reversing the polarity of the supply power source, so that, unless the power source is interrupted at the moment when the reel is stopped by the reverse torque, the reel begins to rotate in the reverse direction. Thus, the timing of the interruption of the reversed polarity power source must be extremely accurate, thereby requiring a complex mechanism. However, a directional difference in braking force is obtained in this type of system, and it also has the same advantages as the torque braking system of the first type.

As described above, frictional braking and electromagnetic braking each have several advantages and disadvantages, so that, even when both of the systems are used together to compensate for these disadvantages, increased cost cannot be avoided.

SUMMARY OF THE INVENTION

Keeping the above points in mind, the object of the present invention is to overcome the defects of conventional brakes by providing a braking device for a three-motor type tape recorder which does not damage the tape, which avoids slackening of the tape, and which can stop the running tape within an extremely short period of time.

DETAILED DESCRIPTION OF THE PREFERRED EMBODIMENT

Figure 1:
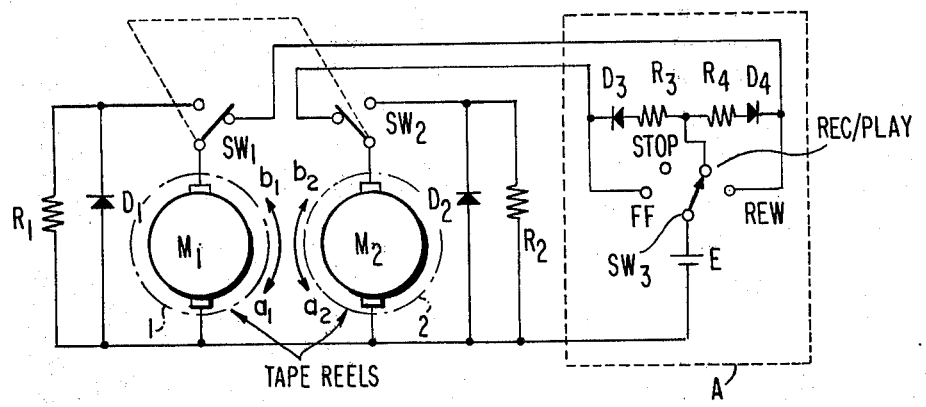
FIG. 1 is a schematic circuit diagram of a preferred embodiment of the invention.

In FIG. 1, M1 and M2 are D.C. motors. M1 drives the supply reel 1, and M2 drives the take-up reel 2. SW1 and SW2 are ganged switches, each having a movable contact on the motor side of the switch, and adapted to switch from the position shown in the drawing to the opposite position by pushing the recorder stop button (not shown). A represents the conventional recorder power supply and tape control circuit which supplies current to the supply reel motor M1 for rewinding, current to the take-up reel motor M2 for the fast forward operation, current to the take-up reel motor M2 for reproduction and recording, and a small current to the supply reel motor M1 at the reproduction and recording, all by means of operating or pushing the conventional rewinding button, fast forward button, reproducing button, or recording button, which buttons are not shown but whose functions, along with that of the stop button, are represented by the four-position switch SW3. D1 and D2 are selenium rectifiers, and R1 and R2 are resistors having large resistance values as compared with the forward resistances of D1 and D2.

The operation of FIG. 1 will now be described. First, in the cases of reproduction or recording, when the reproduction button or the reproduction and recording buttons are pushed, a small current flows in the supply reel motor M1 through the control circuit A to produce a rotational torque in the $a$ direction (designated a1 for motor M1), but a current is also supplied to the take-up reel motor M2 through the control circuit A, whereby the motor M2 starts to rotate in the $a$ direction (designated a2 for motor M2), and the motor M1 thereby actually rotates in $b$ direction (designated b1 for M1). As a result, the tape (not shown) situated between the supply reel 1 and the take-up reel 2 is taken up onto the take-up reel 2, and the tape is under tension.

When the stop button is pushed in order to stop the reproducing or recording state, the switches SW1, SW2 are switched from the position shown to their opposite state and the supply reel motor M1 generates electric power which produces a current which flows in the forward direction through the rectifier D1 and resistance R1, thereby producing an intense braking or reverse torque in the motor M1, to immediately stop the motor.

The take-up reel motor M2 similarly generates power, but the current produced thereby is blocked by the reverse direction property of the rectifier D2 and consequently flows through the resistance R2. Accordingly, this current is relatively weak, so that motor M2 is subjected to only a small braking torque, whereby the running tape is stopped without any slack occurring therein.

In the case of the fast forward, when the fast forward button is pressed, the take-up reel motor M2 is supplied with a current sufficient to perform the fast forward tape feed. When the stop button is pressed to stop the tape, the switches SW1 and SW2 are switched to the position opposite from that shown in the drawing, and an intense braking torque is applied to the motor M1 by the resulting generated current flowing in forward direction through the selenium rectifier D1 and resistance R1 as before. A braking torque is also applied to the motor M2 by its generated current flowing through the resistance R2, whereby the tape again stops quickly without the occurrence of any slack.

In the case of rewinding, by pressing the rewinding button, a sufficient current is supplied to the supply reel motor M1 to effect rewinding. As a result, the motor M1 rotates in the $a$ direction, and the motor M2 in the $b$ direction. When the stop button is pressed in order to terminate this rewinding condition, the switches SW1, SW2 are switched from the position shown in the drawing as stated above, and an intense braking torque is applied to the motor M2 by its resulting generated current flowing in the forward direction through the selenium rectifier D2 and resistance R2. A braking torque is also applied to motor M1 by its generated current M1 flowing through the resistance R1 while being blocked by the reverse direction property of the selenium rectifier D1. Consequently, the tape again stops quickly and without slack.

Figure 2:
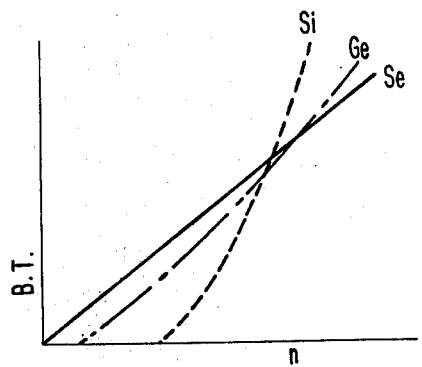
FIG. 2 is a graph showing braking torque characteristic curves of various unidirectional elements.

FIG. 2 shows the relation between the number $n$ of revolutions per minute of a motor and the braking torque (B.T.) of the generated power (brake-torque characteristics) for the cases when the rectifiers D1 and D2 are selenium (Se), germanium (Ge), and silicon (Si). It is observed that, in germanium (Ge) and silicon (Si), the braking torque (B.T.) will not be developed at small values of $n$ because of their threshold voltages. This comparison shows that a selenium rectifier (Se) is the best of all.

Figure 3:
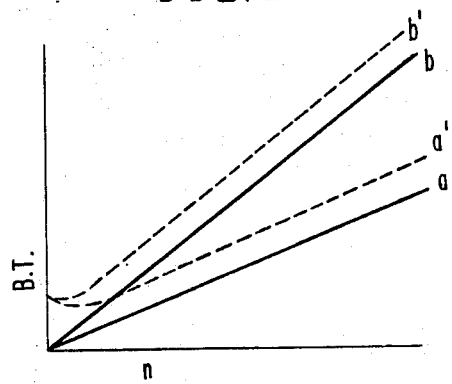
FIG. 3 is a graph showing braking torque characteristic curves of a selenium rectifier.

FIG. 3 shows the brake-torque characteristics for selenium rectifiers as a function of rotation directions $a$ and $b$ as defined above. The curve $a$ shows a brake torque (B.T.) in the case of the $a$ direction of rotation, and the curve $b$ shows the brake torque (B.T.) for the $b$ direction of rotation. The curves $a'$, $b'$ show the brake torques (B.T.) when utilized on cassettes as before, and in this case, a braking torque due to the inherent frictional resistance of the cassette tape itself is added to the current-generated brake torques $a$ and $b$.

Figure 4:
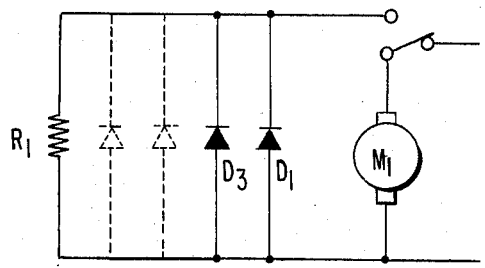
FIGS. 4A–4E are schematic circuit diagrams of variations of the embodiment shown in FIG. 1.
Figure 4:
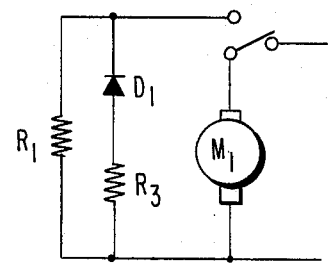
Figure 4:
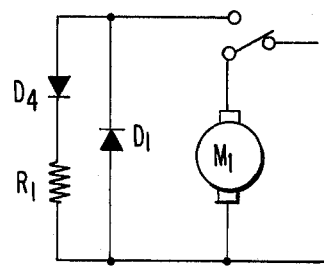
Figure 4:
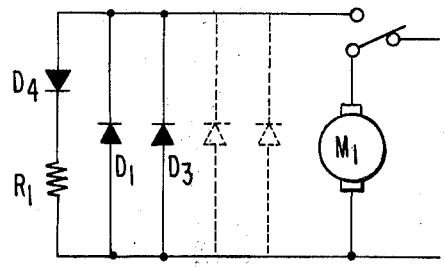
Figure 4:
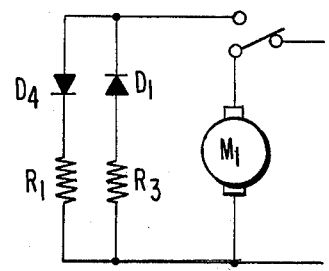

FIGS. 4A–4E show other embodiments, in which FIG. 4A shows the case wherein the braking torque is increased by connecting a number of selenium rectifiers in parallel; FIG. 4B shows the case wherein the braking torque is made to decrease, contrary to the previous case, by inserting a resistance R3 in series with the rectifier D1; FIG. 4C shows the case wherein a braking torque in one direction is regulated by resistor R1 and diode D4, without affecting the braking torque in the other direction through diode D1. FIG. 4D shows the case where the features of A and C are combined. FIG. 4E is similar to FIG. 4C but also includes a resistor R3 connected in series with diode D1 so that the braking torque is reduced for both directions of rotation. Thus, the braking torque can be regulated by properly using different combinations of resistors and rectifiers, whereby the directional braking torque ratio can also be regulated.

It is needless to say that, in the above description relating to the reels and motors, a motor shaft can also be the reel shaft, or the reel can be driven through a belt or idler wheel without any change in operation. This invention is also extremely useful for cassette recorders, as is clear from FIG. 3.

As stated above, the present invention is so constructed that, in a three-motor type tape recorder, a unidirectional element, such as a selenium rectifier, and an appropriate resistance element are connected in parallel with each of the reel driving motors through a switch which can be operated by a push button, whereby braking torque for the reels can be produced by electromagnetic action caused by regenerative braking. Since a directional braking torque ratio is obtained by the use of a unidirectional element, no damage is produced in the tape, and no slackening of tape occurs; furthermore, the running tape can be stopped in an extremely short time, and the braking device is not affected by changes in environmental condition, changes caused by the lapse of time, heat generation, etc. Thus, an extremely ideal braking device for tape recorders is achieved.

I claim:

1. In a tape recorder including a first D.C. motor for driving a tape supply reel and a second D.C. motor for driving a tape take-up reel with recording tape wound on the two reels, and switch means connected between said motors and a power supply for selectively energizing and deenergizing both motors simultaneously, an improved braking system comprising:

a first unidirectional current conducting element and a first resistor connected via said switch means in parallel with said first motor; and a second unidirectional current conducting element and a second resistor connected via said switch means in parallel with said second motor;

said unidirectional current conducting elements being poled such that, upon simultaneous deenergization of both motors, a first regenerative braking current generated by one motor flows in the forward direction through its parallel-connected unidirectional element to immediately brake said one motor to a stop, and a second regenerative braking current generated by the other motor is blocked by its parallel-connected unidirectional element and flows only through its parallel-connected resistor, whereby said second regenerative braking current is less than the first, so that the braking force on said other motor is less than that on said one motor, thereby stopping a running tape without producing slack therein.

2. An improved braking system as defined in claim 1 further comprising another unidirectional current conducting element connected in parallel with said first motor and poled in the same direction as said first element.

3. An improved braking system as defined in claim 1 further comprising a third resistor connected in series with said one unidirectional element for reducing said first regenerative braking current.

4. An improved braking system as defined in claim 1 further comprising a third unidirectional current conducting element connected in series with said first resistor and poled opposite to said first unidirectional element.

5. An improved braking system as defined in claim 4 further comprising a third resistor connected in series with said first unidirectional element.

6. An improved braking system as defined in claim 4 further comprising a fourth unidirectional current conducting element connected in parallel with said first motor and poled in the same direction as said first element.

* * * * *